(12) United States Patent
Wadey et al.

(10) Patent No.: US 9,604,686 B2
(45) Date of Patent: Mar. 28, 2017

(54) MOUNTING DEVICE FOR ONE OR MORE ACCESSORIES AND METHOD OF USING SAME

(71) Applicants: Brian Wadey, Sumner, WA (US); Steven Anthony Ouimet, Bonney Lake, WA (US); Marcos Oquendo, Miami, FL (US); Elizabeth Oquendo, Miami, FL (US)

(72) Inventors: Brian Wadey, Sumner, WA (US); Steven Anthony Ouimet, Bonney Lake, WA (US); Marcos Oquendo, Miami, FL (US); Elizabeth Oquendo, Miami, FL (US)

(73) Assignee: Brian R. Wadey, Sumner, WA (US)

( * ) Notice: Subject to any disclaimer, the term of this patent is extended or adjusted under 35 U.S.C. 154(b) by 129 days.

(21) Appl. No.: 14/591,129

(22) Filed: Jan. 7, 2015

(65) Prior Publication Data

US 2015/0191126 A1    Jul. 9, 2015

Related U.S. Application Data

(60) Provisional application No. 61/924,785, filed on Jan. 8, 2014.

(51) Int. Cl.
*B60R 9/00* (2006.01)
*B62J 11/00* (2006.01)
(Continued)

(52) U.S. Cl.
CPC ............... *B62J 11/00* (2013.01); *B60R 11/02* (2013.01); *B60R 11/04* (2013.01);
(Continued)

(58) Field of Classification Search
CPC ........ Y10S 224/929; B60R 9/00; B60R 11/02; B60R 2011/0075; B60R 2011/0059; B60R 2011/0071
(Continued)

(56) References Cited

U.S. PATENT DOCUMENTS

D370,193 S     5/1996  Shull
6,520,054 B1 * 2/2003  Wang .................. B25B 27/0071
                                              224/425
(Continued)

OTHER PUBLICATIONS

Restriction Requirement in U.S. Appl. No. 29/479,234, dated Jun. 19, 2015.
(Continued)

*Primary Examiner* — Adam Waggenspack
(74) *Attorney, Agent, or Firm* — Mark T. Vogelbacker; Reed Smith LLP

(57) ABSTRACT

A device and method for attaching an accessory to an object includes a housing defining a cavity configured to receive at least a portion of the accessory. A base may be attached to at least a portion of the housing. The base includes at least one of a groove and a projection. The device may also include at least two bands. A first one of the bands surrounds at least a portion of the housing and is configured to secure the accessory within the cavity of the housing. The first one of the bands may be removable from the housing. At least a portion of a second one of the bands may be positioned within the groove or may contact the projection. The second one of the bands and the base combine to secure the device to an object.

19 Claims, 26 Drawing Sheets

(51) Int. Cl.
  *B60R 11/02* (2006.01)
  *B60R 11/04* (2006.01)
  *B60R 11/00* (2006.01)

(52) U.S. Cl.
  CPC ......... *B60R 2011/0059* (2013.01); *B60R 2011/0071* (2013.01); *B60R 2011/0075* (2013.01)

(58) Field of Classification Search
  USPC ............ 224/452, 455, 463, 419, 420, 441
  See application file for complete search history.

(56) References Cited

U.S. PATENT DOCUMENTS

| | | | |
|---|---|---|---|
| D556,017 S | 11/2007 | Hutter, III | |
| 7,448,297 B2* | 11/2008 | Tiong | B62J 11/00 24/285 |
| D596,577 S | 7/2009 | Asano et al. | |
| D605,127 S | 12/2009 | Yasuda et al. | |
| 8,047,364 B2* | 11/2011 | Longinotti-Buitoni | A45C 11/00 206/320 |
| D658,486 S | 5/2012 | Hecht et al. | |
| D666,473 S | 9/2012 | Despotellis | |
| D666,895 S | 9/2012 | Despotellis | |
| D691,461 S | 10/2013 | Waugh et al. | |
| D698,377 S | 1/2014 | McGaughy | |
| D705,168 S | 5/2014 | Yamauchi et al. | |
| D717,157 S | 11/2014 | Widdows et al. | |
| D722,567 S | 2/2015 | Lee et al. | |
| 9,179,975 B2* | 11/2015 | Gitman | A61B 50/33 |
| 2001/0039850 A1 | 11/2001 | Masui | |
| 2010/0170926 A1* | 7/2010 | Richter | B62J 11/00 224/447 |
| 2010/0171832 A1 | 7/2010 | Solida | |
| 2010/0214793 A1 | 8/2010 | Retief | |
| 2010/0264184 A1 | 10/2010 | Retief | |
| 2011/0108443 A1* | 5/2011 | MacKenzie | G11B 33/0422 206/308.1 |

OTHER PUBLICATIONS

Feisol. Feisol Bicycle Mount. Jan. 10, 2013. [Retrieved on Jun. 20, 2014]. Retrieved From Internet: <https://web.archive.org/web/20130110033957/http://www.feisoleurope.com/feisol-bicycle-Mount-P-84.html>. Entire Document.
International Search Report and Written Opinion in PCT Application No. PCT/US2014/022487, Jul. 28, 2014.

\* cited by examiner

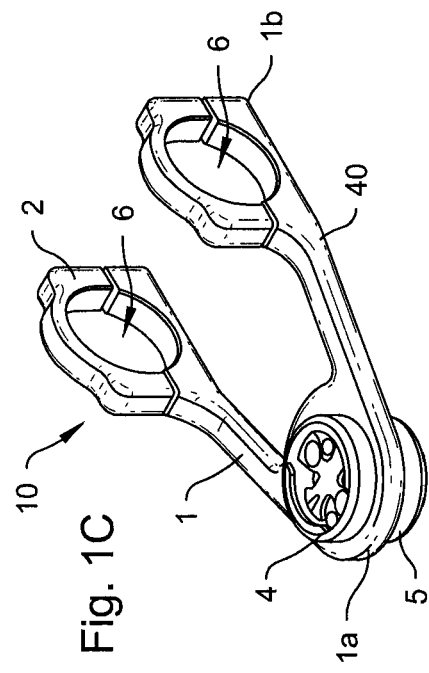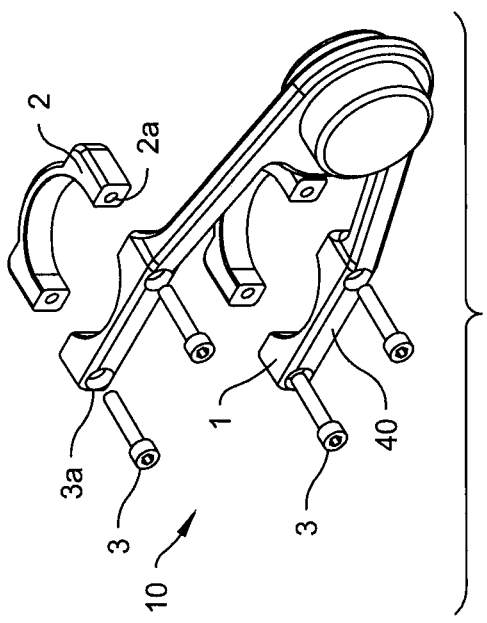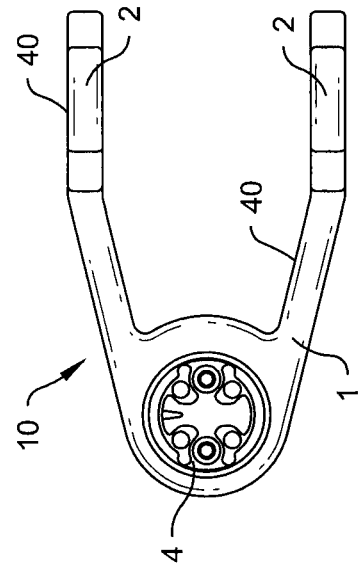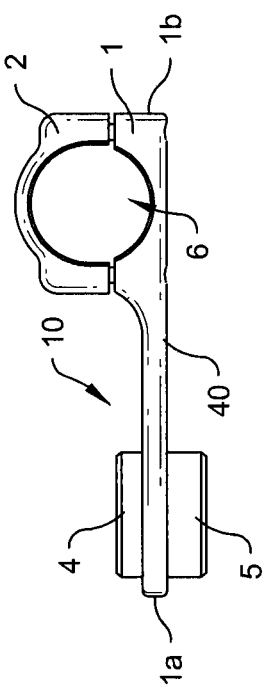

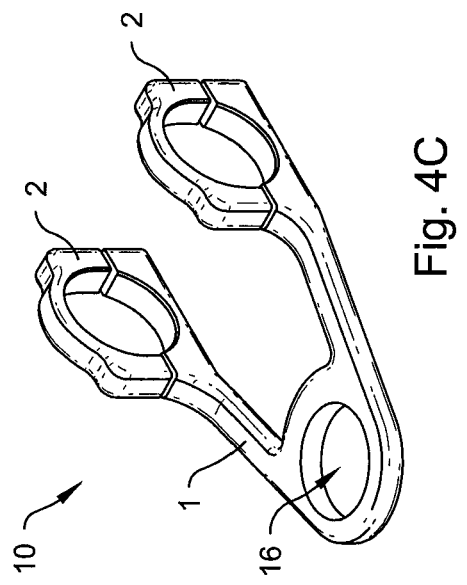
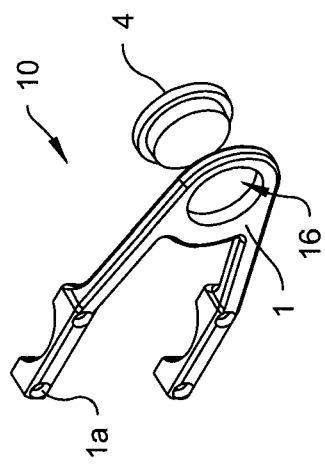
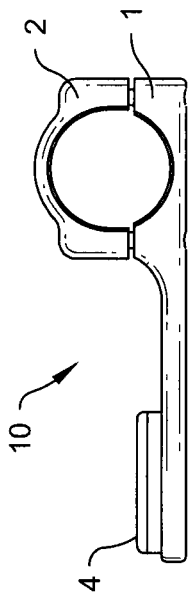
Fig. 4A
Fig. 4B
Fig. 4C

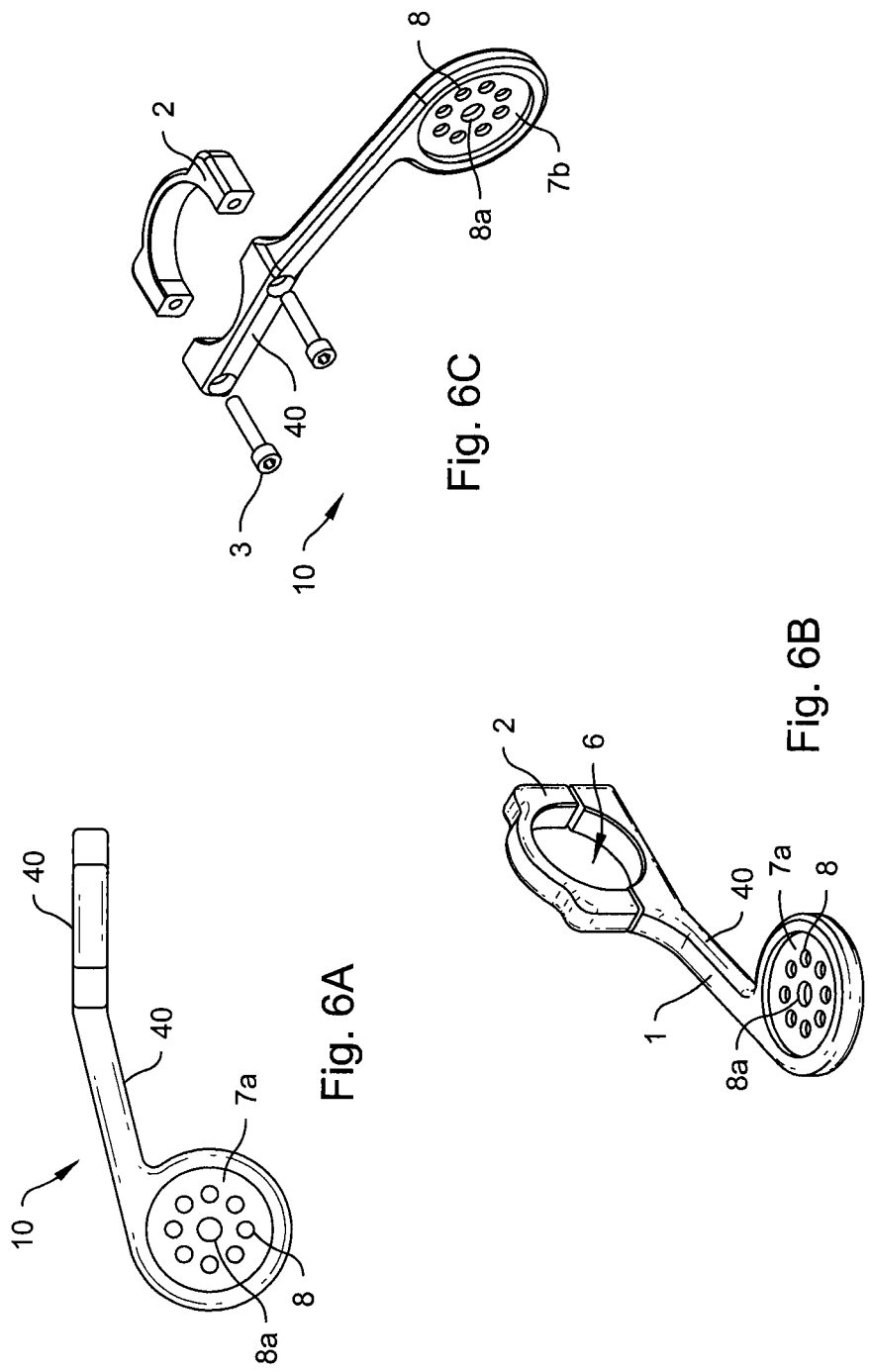

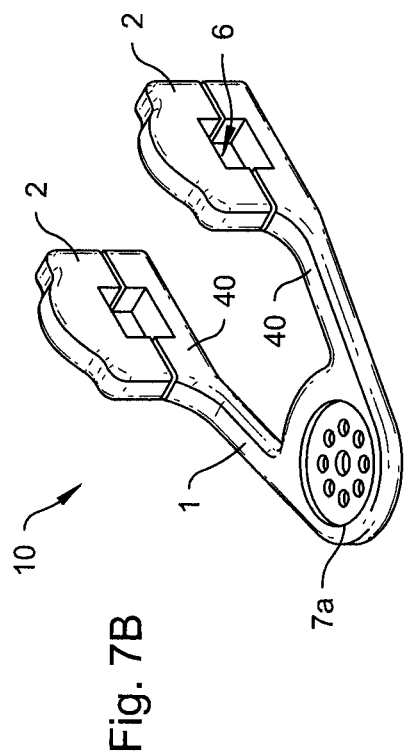
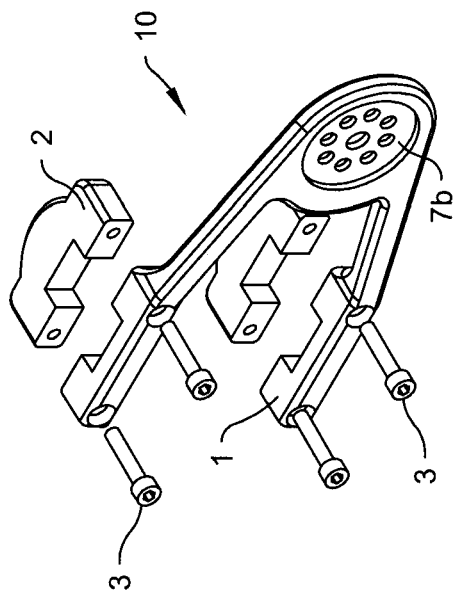
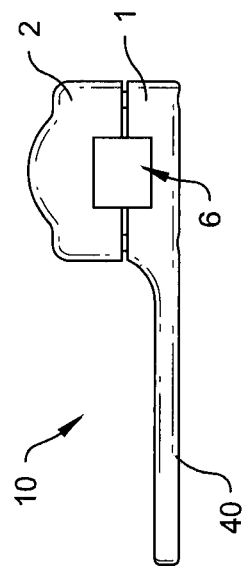
Fig. 7B
Fig. 7C
Fig. 7A

MOUNTING DEVICE FOR ONE OR MORE ACCESSORIES AND METHOD OF USING SAME

CROSS-REFERENCE TO RELATED APPLICATIONS

The present application claims priority to U.S. Provisional Application No. 61/924,785, filed Jan. 8, 2014 and entitled "Universal Mounting Device for One or More Accessories and Method of Using Same," which is herein incorporated by reference in its entirety.

BACKGROUND

The present disclosure relates generally to a mounting device and, more particularly, to an apparatus for and method of mounting one or more accessories to a location and/or an object, such as a motorized or non-motorized vehicle.

Portable devices, such as mobile phones, have become increasingly relied upon by individuals on a daily basis. Such devices or accessories are typically designed for ease of portability, and can often be stored in a pocket or bag of a user. Users often wish to temporarily or permanently mount such portable devices to a wide range of locations and/or equipment, such as a bicycle.

Since technology constantly evolves, portable devices of new and altered designs are frequently introduced into the market. Such state-of-the-art devices typically have new and/or unique mounting mechanisms. Accordingly, users wishing to adopt new portable devices typically are required to comply with the device's mechanism(s) and/or unique structure for affixing the device to a particular location or equipment. Often, this requires that the user purchase and install new mounts to the desired location and/or equipment.

BRIEF SUMMARY

In light of the above, it would be desirable to provide a more robust and more adaptable system for mounting portable devices to various types of locations and/or equipment. It is further desirable to provide a mounting system that can quickly be adapted to suit the mounting requirements of currently available and new portable devices without a large-out-of-pocket expense to the user. The device of the present application accomplishes the above and other objectives.

One embodiment of the present disclosure is directed generally to a device for attaching an accessory to an object. The device includes a housing defining a cavity configured to receive at least a portion of the accessory. A base is attached to at least a portion of the housing. The base includes at least one of a groove and a projection. The device may also include at least two bands. A first one of the bands surrounds at least a portion of the housing and is configured to secure the accessory within the cavity of the housing. The first one of the bands may be removable from the housing. At least a portion of a second one of the bands may be positioned within the groove or may contact the projection. The second one of the bands and the base combine to secure the device to an object.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 1A is a top plan view of a mounting device according to a first embodiment of the present disclosure;

FIG. 1B is a side elevation view thereof;

FIG. 1C is a front perspective view thereof;

FIG. 1D is a partially exploded bottom perspective view thereof;

FIG. 4A is a partially exploded bottom perspective view of a mounting device according to a second embodiment of the present disclosure;

FIG. 4B is a side elevation view of a modified version of the 1 mounting device shown in FIG. 4A;

FIG. 4C is a front perspective view thereof;

FIG. 6A is a top elevation view of a mounting device according to a fourth embodiment of the present disclosure;

FIG. 6B is a front perspective view thereof;

FIG. 6C is a partially exploded bottom perspective view thereof;

FIG. 7A is a side elevation view of a mounting device according to a fifth embodiment of the present disclosure;

FIG. 7B is a front perspective view thereof;

FIG. 7C is a partially exploded bottom perspective view thereof;

DETAILED DESCRIPTION

Figure 2A:
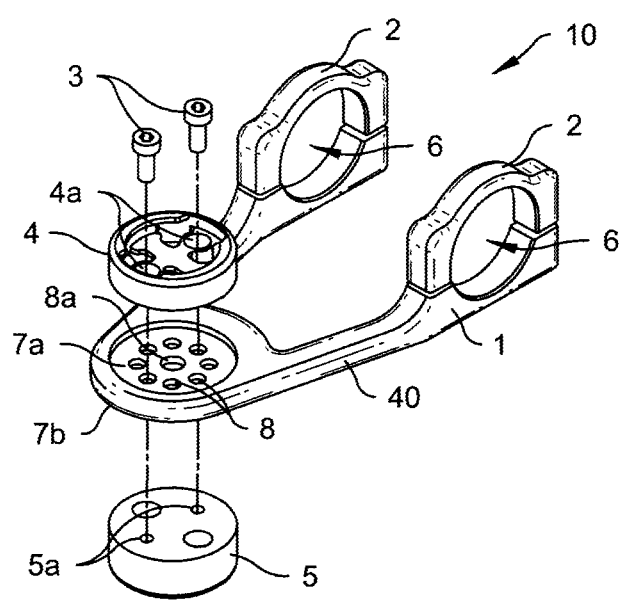
FIG. 2A is a partially exploded top perspective view thereof.

Certain terminology is used in the following description for convenience only and is not limiting. The words "lower," "bottom," "top" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Referring to the drawings in detail, wherein like reference numerals indicate like elements throughout, FIGS. 1A-1D illustrate a universal mounting device ("UMD"), generally designated 10, according to a first embodiment of the present disclose. The UMD 10 may removably or permanently attach one, two or more accessories 12 (see FIGS. 8-10) to a location and/or an object 14 (see FIGS. 8-10). The assessor 12 may be a mobile or cellular phone, computer tablet, MP3 player, flashlight (see FIG. 10), navigation or GPS unit (see FIGS. 8-10), gaming unit, radio, speaker, camera (see FIG. 8) or the like. The object 14 may be a bicycle (see FIGS. 8-10), scooter, tricycle, stroller, golf cart, boat, all-terrain vehicle ("ATV"), snowmobile, personal watercraft, motorcycle, recreational vehicle ("RV"), personal mobility or transportation device (e.g., a SEGWAY® or a wheelchair), shopping cart, car, train, bus, personal protection device (e.g., a helmet), forklift, aircraft, industrial truck, point of sale or cash register, or the like, while the location may be a wall, ceiling, bannister, railing, pole, or the like.

The UMD 10 may be a dual contact mount that includes a generally elongated frame or chassis 1. At least one or more separate and spaced-apart chassis caps 2 may removably or permanently attach to at least a portion of the chassis 1. Each chassis cap 2 may be coupled to the chassis 1 by at least one or more mounting hardware 3, such as a screw or bolt. The mounting hardware 3 may be head cap screws, or the like. The head cap screws may be M4×0.7" attaching hardware.

The chassis caps 2 may be at least substantially equal or identical in size, shape and/or configuration. As shown in FIGS. 1B-2A, 3A and 3B, an inner or bottom surface of each chassis cap 2 may define a semi-circular area. The chassis caps 2 may be machined to eliminate sharp edges by applying a radius/edge break on all outer periphery surfaces. The radius/edge break may be approximately 0.062. As shown in FIGS. 1D and 3B, to attach one of the chassis caps 2 to the chassis 1, the mounting hardware 3 may be inserted at least generally, if not exactly, perpendicularly to a bottom surface of the chassis 1, through threaded holes 1a in the chassis 1, and into threaded bore holes 2a in the chassis cap 2. The threading of the bore holes 2a may be a M4×0.7 thread specification. Alternatively, each chassis cap 2 may be pivotably attached to a portion of the chassis 1, or only a portion of each chassis cap 2 may be removably attachable to the chassis 1, while another portion of each chassis cap 2 may be fixedly attached and/or integrally formed with the chassis 1.

Figure 8:
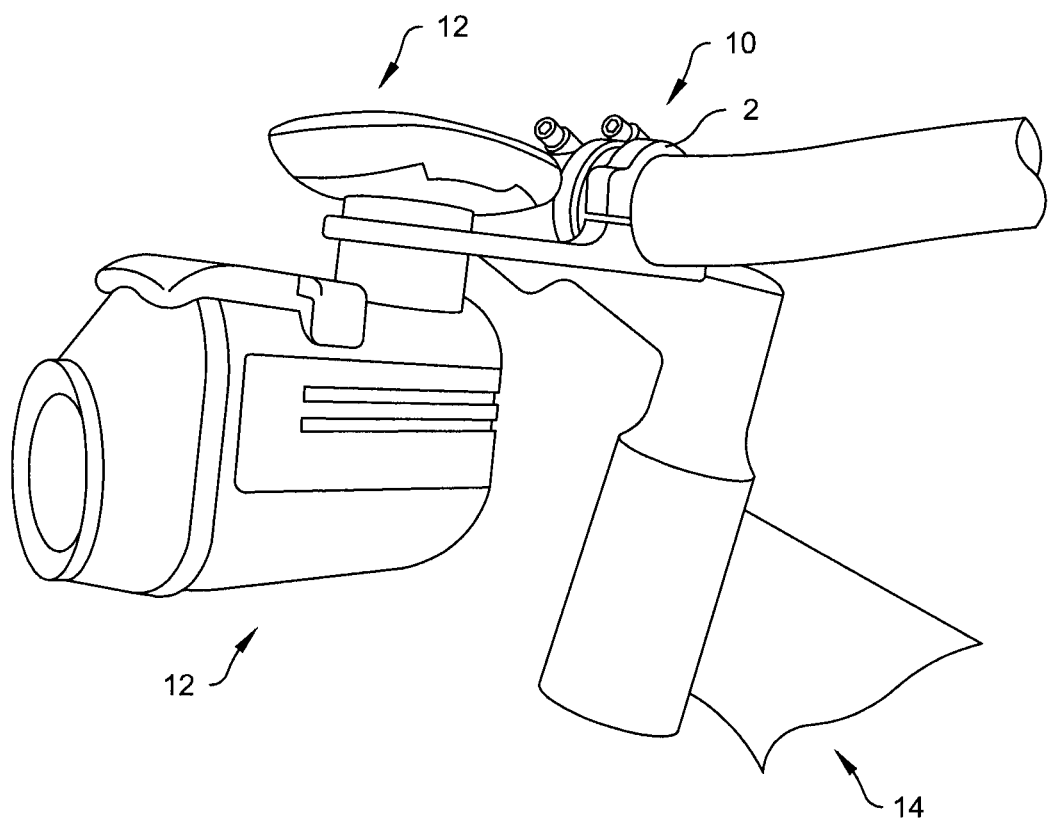
FIG. 8 is a perspective view of the mounting device of FIGS. 1A-1D coupling one or more portable accessories to an object.
Figure 9:
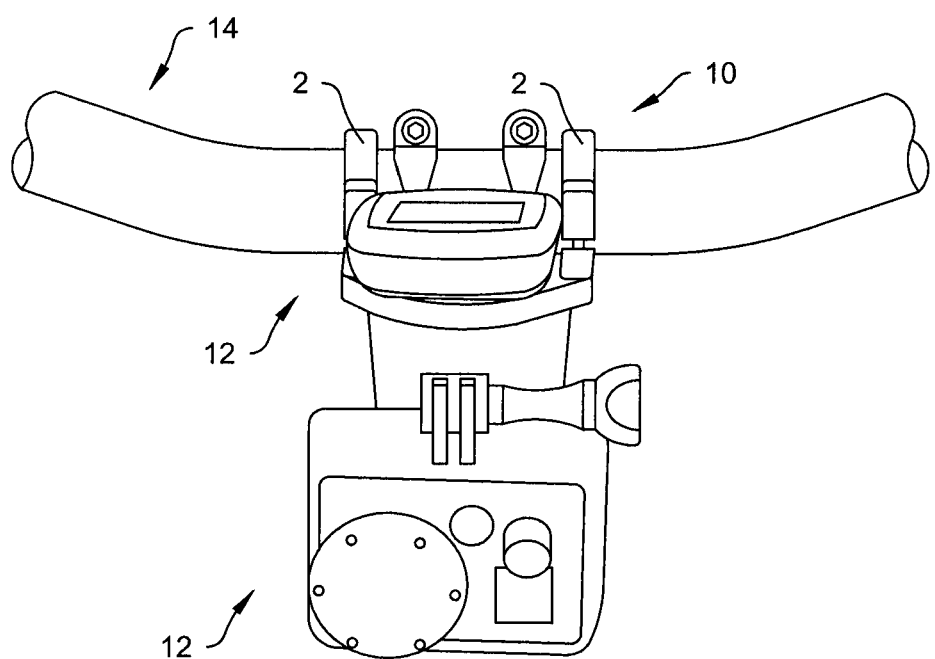
FIG. 9 is another perspective view of the mounting device of FIGS. 1A-1D coupling one or more portable accessories to an object.
Figure 10:
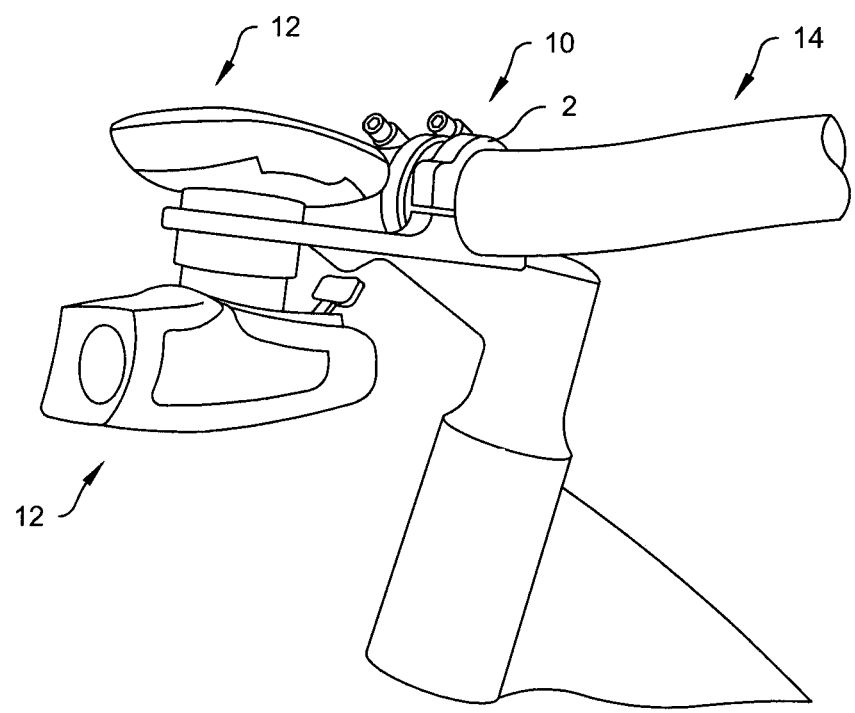
FIG. 10 is yet another perspective view of the mounting device of FIGS. 1A-1D coupling one or more portable accessories to an object.

When properly attached or "closed" (see FIGS. 1B, 1C, 2A and 3A), at least a portion of the chassis 1 and a bottom surface of the chassis cap(s) 2 may define a hollow, generally rounded attachment area or passageway 6 for mounting the UMD 10 to a location and/or a portion of the object 14, such as onto the handlebars of a bicycle (see FIGS. 8-10). Various configurations, sizes, and/or shapes for the attachment area(s) 6 may be created by varying the size of the chassis 1 and the chassis cap(s) 2. For example, each attachment area 6 may have a generally square (see FIGS. 7A-7C), triangular or rectangular (see FIGS. 7A-7C) cross-sectional shape. As shown in FIG. 1C, the UMD 10 may have two spaced-apart and aligned attachment areas 6, which allows a handlebar to easily pass therethrough while providing stability to the UMD 10 when mounted to a bicycle 14, for example. At least three different sizes of the attachment area(s) 6 may be provided to adapt to specific tubing size (22.2 mm, 25.4 mm and 31.8 mm). Furthermore, other attaching/mounting solutions may be utilized instead or in place of the attachment area(s) 6, including, but not limited to, flush mount, magnetic mount, and Quick Release Pin Mount.

The UMD 10 may directly attach to one, two or more of the accessories 12. One or more accessories 12 may be mounted directly onto a top surface of a first portion 7a (see FIGS. 2A and 3A) of the chassis 1 and one or more accessories 12 may be mounted directly onto an opposing, bottom surface of a second portion 7b (see FIG. 3B) of the chassis 1. For example, at least one navigation unit 12 may be mounted to the first portion or top mount interface 7a of the UMD 10, while at least one video camera 12 can be mounted to the second portion 7b or bottom mount interface of the UMD 10.

Alternatively, the UMD 10 may indirectly attach to one or more of the accessories 12, such that the UMD 10 may accept one or more types, styles, and/or designs of accessory mounts 4, 5 adapted for use with various types of accessories 12. In particular, first and second accessory mounts 4, 5 may be removably or fixedly attached to at least a portion of the UMD 10, such at the top and bottom mount interfaces 7a, 7b, respectively. Various designs of the first and second accessory mounts 4, 5 may be created and/or configured to interface with a variety of accessories 12. For example, the first accessory mount 4 may be configured to interface with a GARMIN EDGE mounting surface and simultaneously or subsequently interface with another accessory 12. The first accessory mount 4 may be machined from a polymeric material, such as DELRIN®, to securely mount accessories without damaging their mating surfaces.

Figure 2B:
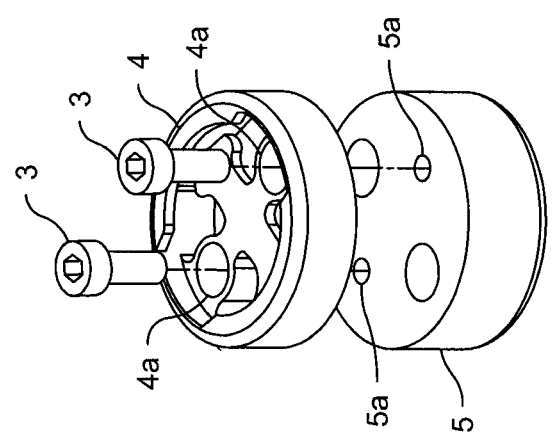
FIG. 2B is an enlarged top perspective view of a portion of the mounting device shown in FIGS. 1A-2A.

Referring to FIGS. 1C, 2A and 2B, the first accessory mount 4 may be coupled to a top or upper surface of the chassis 1 at a front end 1a thereof. The second accessory mount 5 may be coupled to an opposing bottom or lower surface of the chassis 1. However, the above-described positioning of the first and second accessory mounts 4, 5 may be reversed. The first accessory mount 4 and the second accessory mount 5 may be positioned in mirror arrangement to one another, with the chassis 1 positioned therebetween.

As shown in FIG. 2B, at least a top surface of the first accessory mount 4 may include a predetermined configuration of projections and/or grooves that mate with or receive at least a portion of a variety of different types and/or sizes of the accessories 12. One or more threaded holes 4a may extend through the first accessory mount 4 for receiving at least a portion of one of the mounting hardware 3. One or more threaded bore holes 5a may extend into a top surface of the second accessory mount for receiving at least a portion of one of the mounting hardware 3.

Figure 3A:
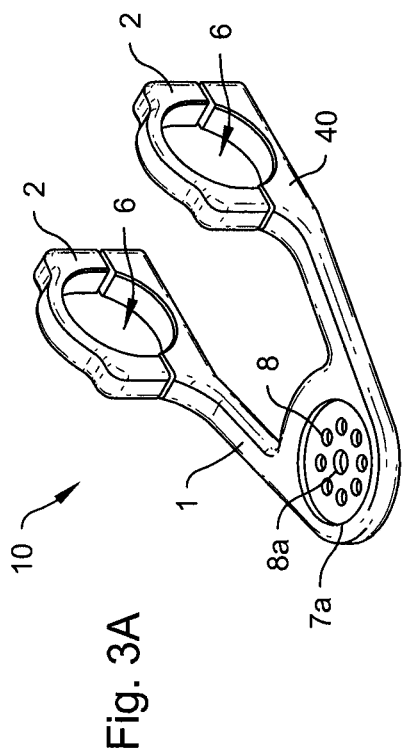
FIG. 3A is a front perspective view of the mounting device shown in FIGS. 1A-2A with portions removed for clarity.
Figure 3B:
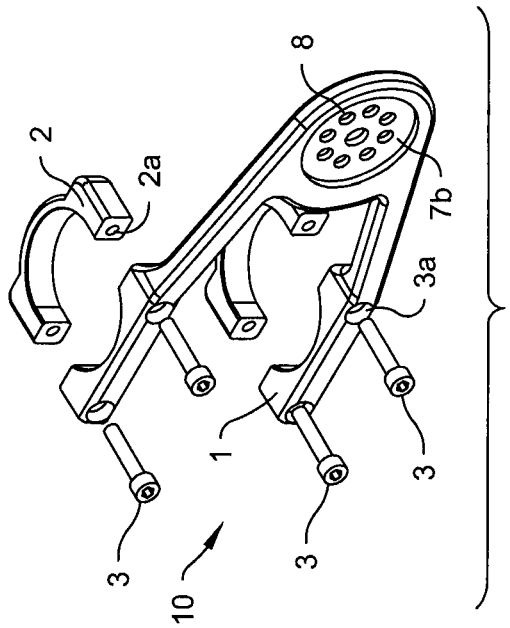
FIG. 3B is a partially exploded bottom perspective view of the mounting device shown in FIGS. 1A-2A with portions removed for clarity.

The first and second accessory mounts 4, 5 and the top and bottom mount interfaces 7a, 7b may be generally rounded when viewed from above or below. However, such features are not limited to the size, shape and/or configuration shown and described herein. As shown in FIGS. 2A, 3A and 3B, the top and bottom mount interfaces 7a, 7b may be at least slightly recessed into the top and bottom surfaces, respectively, of the chassis 1, such that the outer periphery of the accessory mount 4 and/or the accessory mount cap 5 may be positioned at least slightly within the recessed area.

Each of the top and bottom mount interfaces 7a, 7b may include a plurality of spaced-apart through holes 8 arranged in a circular pattern around a center hole 8a. The through holes 8 may pass transversely through the chassis 1 from the top mount interface 7a to the bottom mount interface 7b. Each through hole 8 may be sized and/or shape to allow at least a portion of one or the mounting hardware 3 to pass therethrough. As shown in FIG. 2A, the mounting hardware 3 may secure the top accessory mount 4 and the accessory mount cap 5 to the chassis 1 of the UMD 10 at the top and bottom mount interfaces 7a, 7b, respectively. At least a portion of at least one of the mounting hardware 3 may pass through one of the holes 4a in the top accessory mount 4, through the top and bottom mount interfaces 7a, 7b at one of the through holes 8, and is threadably coupled to the accessory mount cap 5 at one of the threaded bore holes 5a.

Alternatively or additionally, the top and bottom mount interfaces 7a, 7b may be reconfigured with other interconnection features, such as threads, or a "feature to feature" locking design, that allows fittings or accessories 12 to be secured to the UMD 10 without additional hardware. Such a design would further reduce weight concerns. Furthermore, the top accessory mount 4 may be capable of attaching one or more accessories 12 to the UMD 10 without the bottom accessory mount 5, and vice-versa. For example, the top accessory mount may be fixedly attached to the UMD 10 by inserting at least a portion of at least one of the mounting hardware 3 through one of the holes 4a in the top accessory mount and into one of the through holes 8. In such a configuration, the bottom mount interface 7b may remain exposed due to the omission of the bottom accessory mount 5.

The chassis 1 may be composed or formed of a metallic material, such as aluminum or an alloy thereof. The aluminum may be an aircraft grade material such as Aluminum 6061 to provide rigidity for the UMD 10. However, the UMD 10 is not limited to any material, and those skilled in the art will understand that other metal and non-metal materials, such as carbon fiber, graphite, steel, a polymeric material and the like, are suitable for use in the UMD 10. An anodized finish may be applied to the UMD 10. However, other finishing processes or no finish may be applied. The chassis 1 may be manufactured as a single, unitary and continuous body, and may be constructed to eliminate sharp edges. The chassis 1 may be machined by applying a radius/edge break of approximately 0.062 on all outer periphery surfaces. The outer periphery of the chassis 1 may be minimized to reduce natural atmospheric resistance. The body of the UMD 10 may be modified/enhanced to aid in the performance by including additional "lighting" holes and/or modifying the edge radii. Furthermore, the overall current size (e.g., length, width and height) and shape of the components of the UMD 10 when assembled may be modified as necessary.

As shown in FIG. 1B, the chassis 1 of the UMD 10 may include a first end 1a and an opposing second end 1b. The first end 1a may be at least generally rounded, and may define the top and bottom mount interfaces 7a, 7b. The second end 1b may include two spaced-apart arms or legs 40. As shown in FIG. 1A, at least a portion of the legs 40 may extend generally parallel to one another. Alternatively or additionally, the legs 40, or at least a portion thereof, may extend at an angle of greater than zero degrees (0°) and less than ninety degrees (90°) with respect to one another. For example, the legs 40 may extend at an angle of approximately thirty degrees (30°) from one another. The legs 40 may have substantially or exactly the same length. The UMD 10 is not limited to any particular number of legs 40, and may have only one leg 40 (see FIG. 6A-6C), or more than two legs 40 in order to provide additional support contact points. Referring to FIGS. 1B-2A, 3A and 3B, at least a portion of a top surface of each leg 40 may define an arcuate or concave surface having a first radius. At least a portion of the top surface of each leg 40 is configured to couple with the arcuate bottom surface of one of the chassis caps 2 to define the passageway 6.

FIG. 4A shows a second embodiment of the UMD 10. The second embodiment is substantially similar to the first embodiment described in detail above. Description of certain similarities between the two embodiments may be omitted herein for the sake of brevity and convenience, but such omission is not limiting. In the second embodiment, the chassis cap(s) 2 may be omitted, such that the chassis 1 may directly attach to the location and/or object 14. For example, at least a portion of one of the mounting hardware 3 may be inserted into one of the threaded holes 1a in the chassis 1 and into the location and/or object 14. The location and/or object 14 may include one or more preformed holes (not shown) for receiving at least a portion of one or more of the mounting hardware 3.

In addition, the second embodiment of the UMD 10 may omit the top and bottom mount interfaces 7a, 7b, such that a passageway 16 extends completely through the chassis 10. The passageway 16 may be at least generally, if not exactly, circular when viewed from above and below. The passageway 16 may have a smooth peripheral surface (see FIG. 4A), or the passageway 16 may have screw threads. At least a portion of the first accessory mount 4 may be sized, shaped and/or configured to complementarily engage or mate with at least a portion of the passageway 16. The first accessory mount 4 may be retained onto the chassis 1 by a friction fit.

FIGS. 4B and 4C show a modified version of the second embodiment of the UMD 10. The modified version of the second embodiment is substantially similar to the second embodiment described in detail above. Description of certain similarities between the modified version and the second embodiment may be omitted herein for the sake of brevity and convenience, but such omission is not limiting. In the modified embodiment, two chassis caps 2 may be used to attach the chassis 1 to the location and/or object 14.

Figure 5A:
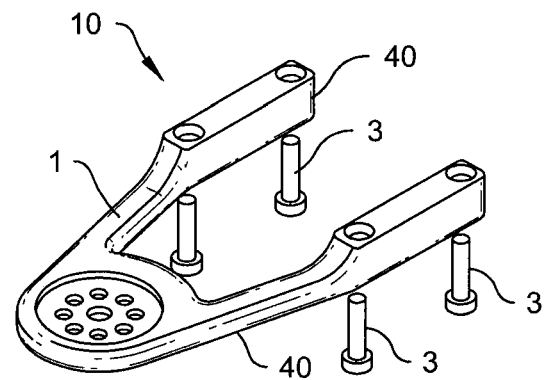
FIG. 5A is a front perspective view of a mounting device according to a third embodiment of the present disclosure.
Figure 5B:
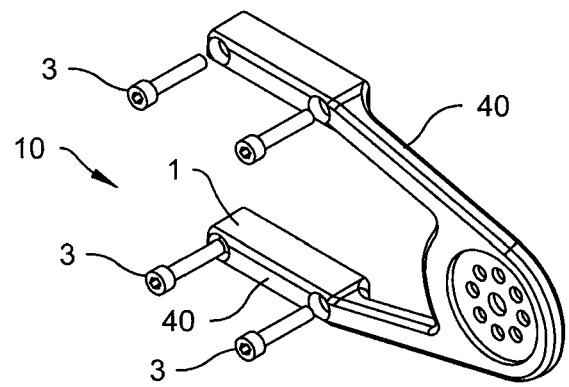
FIG. 5B is a partially exploded bottom perspective view thereof.

FIGS. 5A and 5B show a third embodiment of the UMD 10, which is substantially similar to the first and second embodiments described in detail above. Description of certain similarities between the embodiments may be omitted herein for the sake of brevity and convenience, but such omission is not limiting. A distinguishing feature of the third embodiment is that at least a portion of the top surface of each leg 40 of the chassis 1 is flat or planar. Such a feature allows the UMD 10 to be quickly and easily attached to a flat surface of a location and/or object 14. For example, the UMD 10 could be flushly mounted beneath a horizontally-extending surface. Similar to the second embodiment, the third embodiment of the UMD 10 may omit the chassis cap(s) 2 such that at least one and possibly four of the mounting hardware 3 pass through the chassis 1 and into the location and/or object 14 to attach the UMD 10 to the location and/or the object 14.

FIGS. 6A-6C show a fourth embodiment of the UMD 10. The fourth embodiment is substantially similar to the first embodiment described in detail above. Description of certain similarities between the two embodiments may be omitted herein for the sake of brevity and convenience, but such omission is not limiting. A distinguishing feature of the fourth embodiment is that the chassis 1 includes only a single leg 40. Thus the UMD 10 of the fourth embodiment is a single contact mount, which means that the UMD 10 contacts the location and/or object 14 at generally only a single point.

FIG. 7A-7C show a fifth embodiment of the UMD 10, which is substantially similar to the first embodiment described in detail above. Description of certain similarities between the two embodiments may be omitted herein for the sake of brevity and convenience, but such omission is not limiting. A distinguishing feature of the fifth embodiment is that one or more of the attachment areas 6 have a generally square or rectangular shape. Such a configuration is beneficial when it is desirable to mount or attach the UMD 10 to a location and/or object 14 that has a similar cross-sectional shape.

FIGS. 11-15 show a sixth embodiment of the UMD 10. The UMD 10 may include a housing or cradle 18 that is generally sized, shaped and/or configured to receive one or more accessories 12 at least partially within a cavity 50 thereof (see FIG. 14). In particular, the cavity 50 may have a generally square or rectangular shape (when viewed from above), may be spaced at least slightly inwardly from an outer periphery of the housing 18, and may at least partially or completely receive one or multiple accessories 12, such as a mobile phone 12a (see FIG. 11), a case 12b for a credit card or a mobile phone (see FIGS. 12 and 14), a key 12c (see FIGS. 12 and 14), a credit card, a business card, or the like. The credit card(s), business card(s) or the like may be placed beneath the phone 12a and/or the case 12b within the cavity 50, or even between the phone 12a and the case 12b. The key 12c may be placed between the phone 12a and the case 12b. While the first through fifth embodiments of the UMD 10 described above may extend at least partially outwardly and/or forwardly from the object 14 when mounted thereto, the sixth embodiment of the UMD 10 may extend at slightly laterally beyond and/or above the object 14 (such as handlebars of a bicycle) when mounted thereto.

Figure 14:
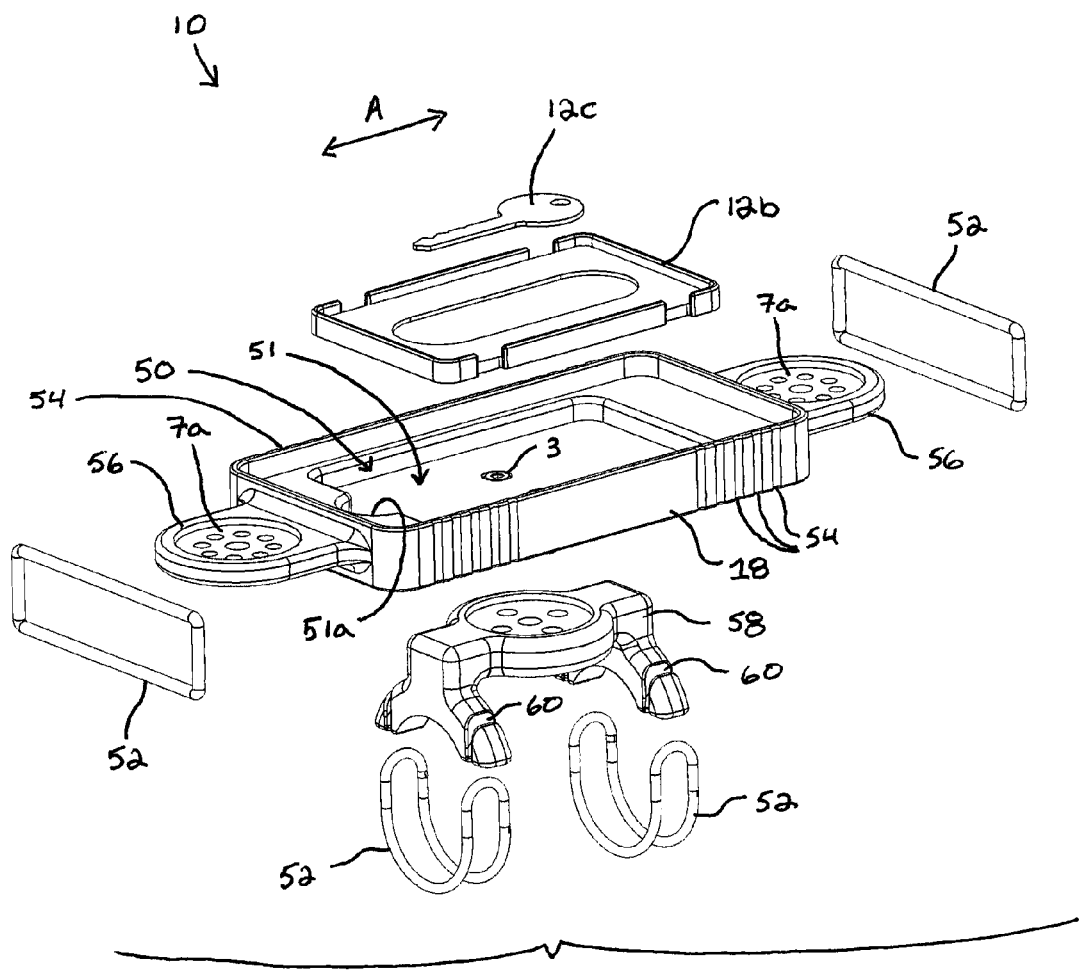
FIG. 14 is a partially exploded top perspective view thereof.
Figure 15:
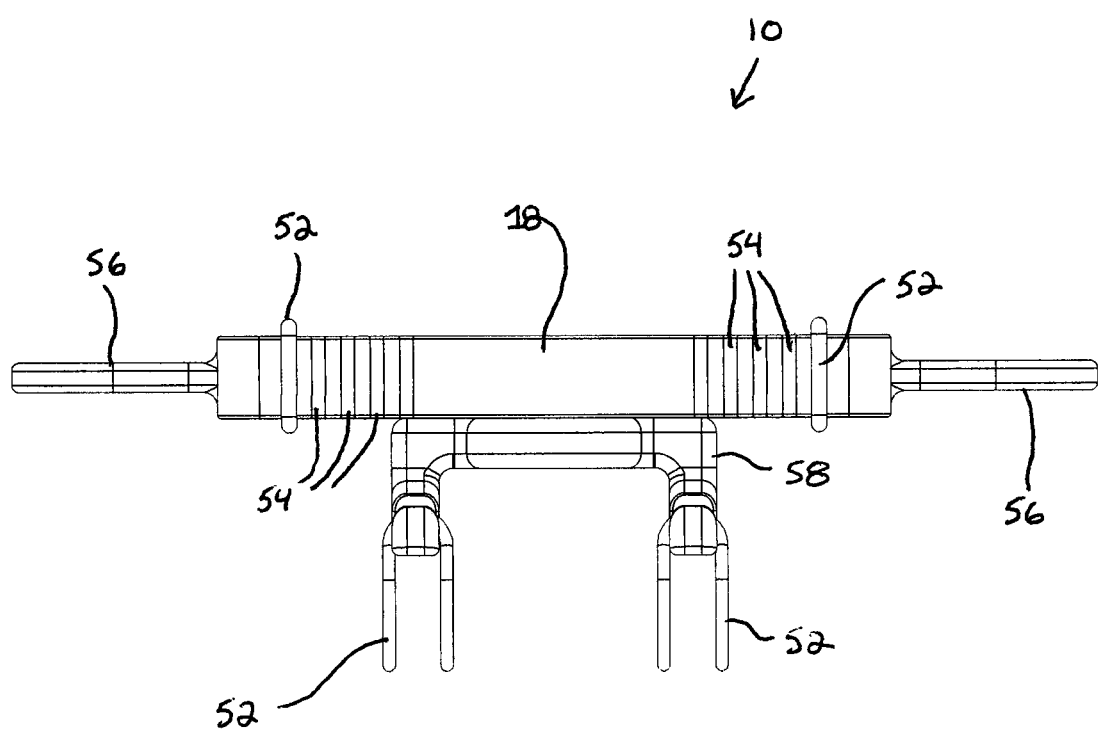
FIG. 15 is a front elevation view thereof.
Figure 16:
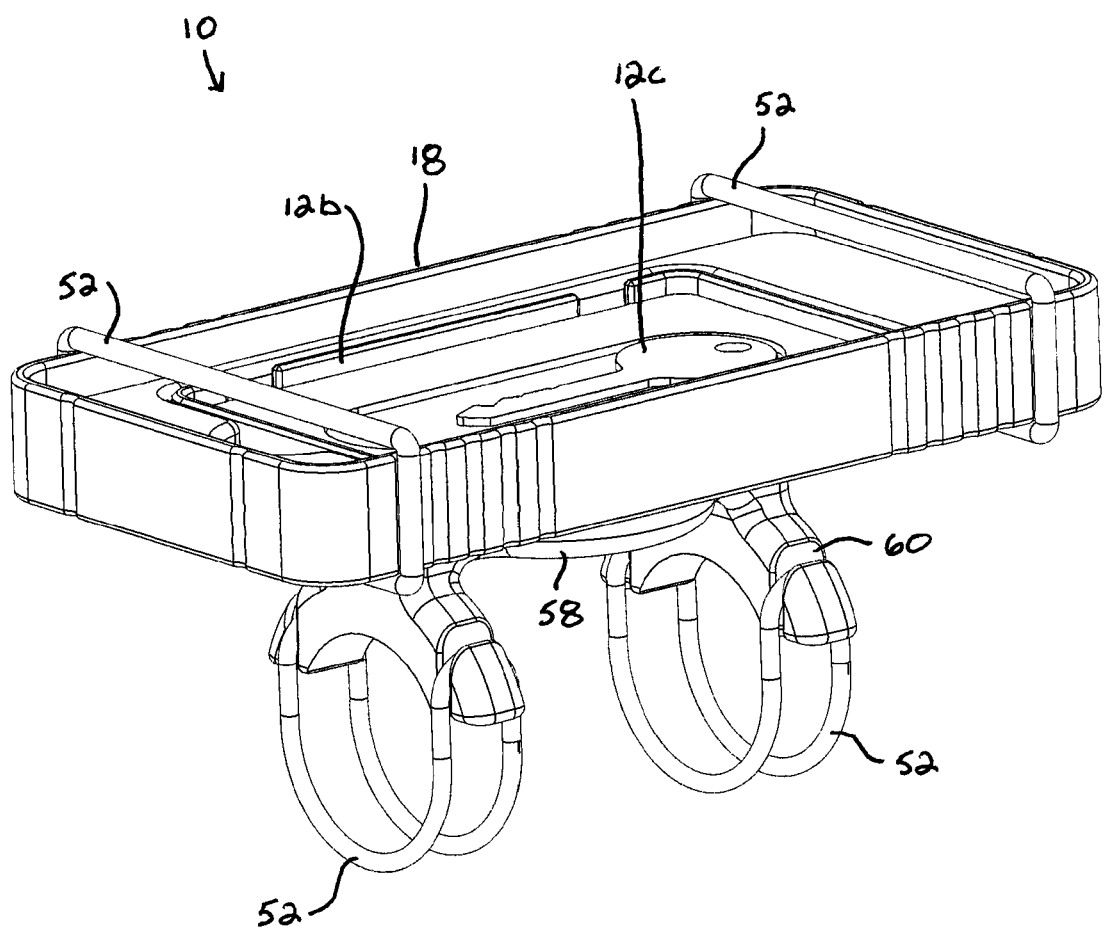
FIG. 16 is a top perspective view of a mounting device according to a seventh embodiment of the present disclosure, wherein various accessories are shown.

As shown in FIG. 14, a recess 51 may be formed within and/or beneath the cavity 50. The recess 51 may be sized, shaped and/or configured to receive at least a portion of the case 12b therein. The phone 12a may be too large to fit within the recess 51. Alternatively, the phone 12a may be sized, shaped and/or configured to fit at least partially or even completely within the recess 51. For example, a bottom surface of the phone 12a may contact and extend parallel to a bottom surface of the recess 51 in an embodiment where the phone 12a fits within the recess 51. At least one cut-out or groove 51a may be formed within the cavity 50 and/or the recess 51 to allow a user to more easily remove the case 12b or another object from the cavity 50 and/or the recess 51. In one embodiment, a cut-out 51a may be formed on opposing sides of the cavity 50 and/or the recess 51 to allow a user to more easily remove an object from the cavity 50 and/or the recess 51.

One or more bands or straps 52 may surround at least a portion of the housing 18 and the accessories 12 therein. Each band 52 may be a generally flexible. In particular, each band 52 may be an elastic ring, such as a Buna-N O-ring or a rubber band. Each band 52 may be removably mountable to at least a portion of the housing 18, for example to secure the accessory 12 in within the housing 18 or allow the accessory 12 to be separated from the housing 18. In particular, each band 52 may be moved (e.g., by a user) laterally inwardly and outwardly with respect to a central portion of the housing 18 (see arrow A in FIG. 14). The bands 52 may be movable to accommodate accessories 12 of various sizes and/or shapes, and/or allow the user to relatively easily insert or remove the accessory 12 from the housing 18. The bands 52 may generally maintain the size and/or shape shown in FIG. 14 when not mounted to the housing 18, or the bands 52 may revert to a different or eccentric shape when not mounted or attached to the housing 18.

At least a portion of the exterior of the housing 18 may include one or a series of vertically-extending ridges or grooves 54, which may prevent or at least reduce unintended removal or movement of the bands 52 with respect to the housing 18. The ridges or grooves 54 may extend the entire height of the housing 18, and may be located at one or more (such as four) discrete points on an exterior of the housing 18. In the present embodiment, two separate and spaced-apart groupings of ridges or grooves 54 may be located on two opposing sides of the housing 18 (see FIG. 11). At least a portion of each band 54 may be sized, shaped and/or configured to engage or be received by one of the ridges or grooves 54.

One or more extensions 56 may extend laterally outwardly from the housing 18. Each extension 56 may include the top and bottom mount interfaces 7a, 7b, as described in detail above. However, the extensions 56 are not limited to include of the top and bottom mount interfaces 7a, 7b, as the extensions 56 may each include a passageway 16 (as shown in FIGS. 4A and 4C) or another type of attachment mechanism. The first and second accessory mounts 4, 5, as described in the embodiments above, may be removably attached to the extensions 56 for removably attaching one or more accessories 10 to the UMD 10.

Referring to FIG. 14, a base or mount 58 may attach the housing 18 to the location and/or object 14. In particular, one or more of the mounting hardware 3 may extend through a portion of the housing 18, such as the cavity 50, and into or through a portion of the base 58. One or more of the bands 52 may surround at least a portion of the base 58 and the location and/or object 14 to removably attach the base 58 to the location and/or object 14. The base 58 may include one or a plurality of grooves 60, each of which may be sized, shaped and/or configured to receive at least a portion of one of the bands 52. Alternatively or additionally, one or more of the grooves 60 may be a projection extending outwardly and/or upwardly from at least a portion of the base 58.

Figure 11:
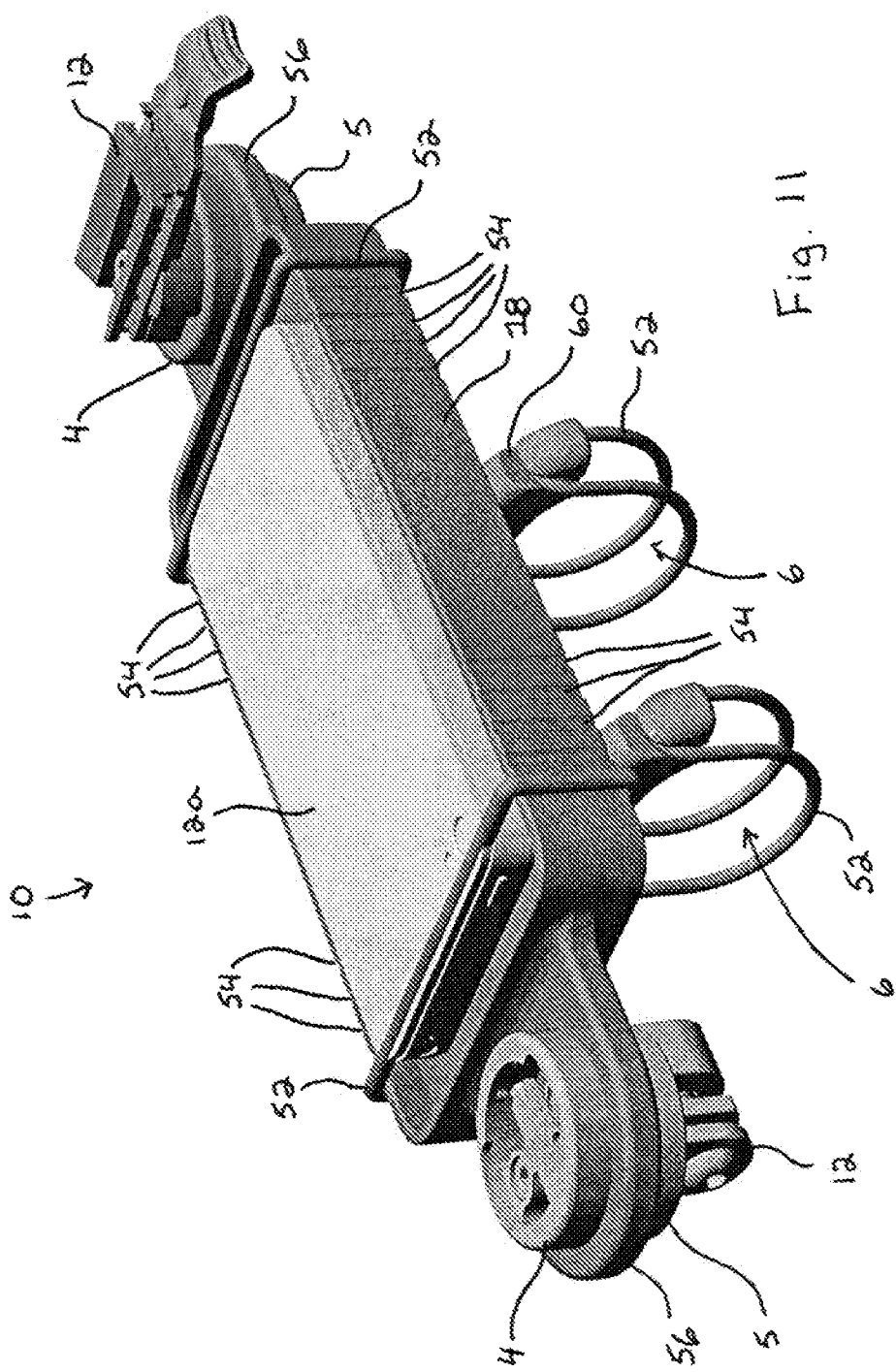
FIG. 11 is a top perspective view of a mounting device according to a sixth embodiment of the present disclosure, wherein various accessories are shown.
Figure 12:
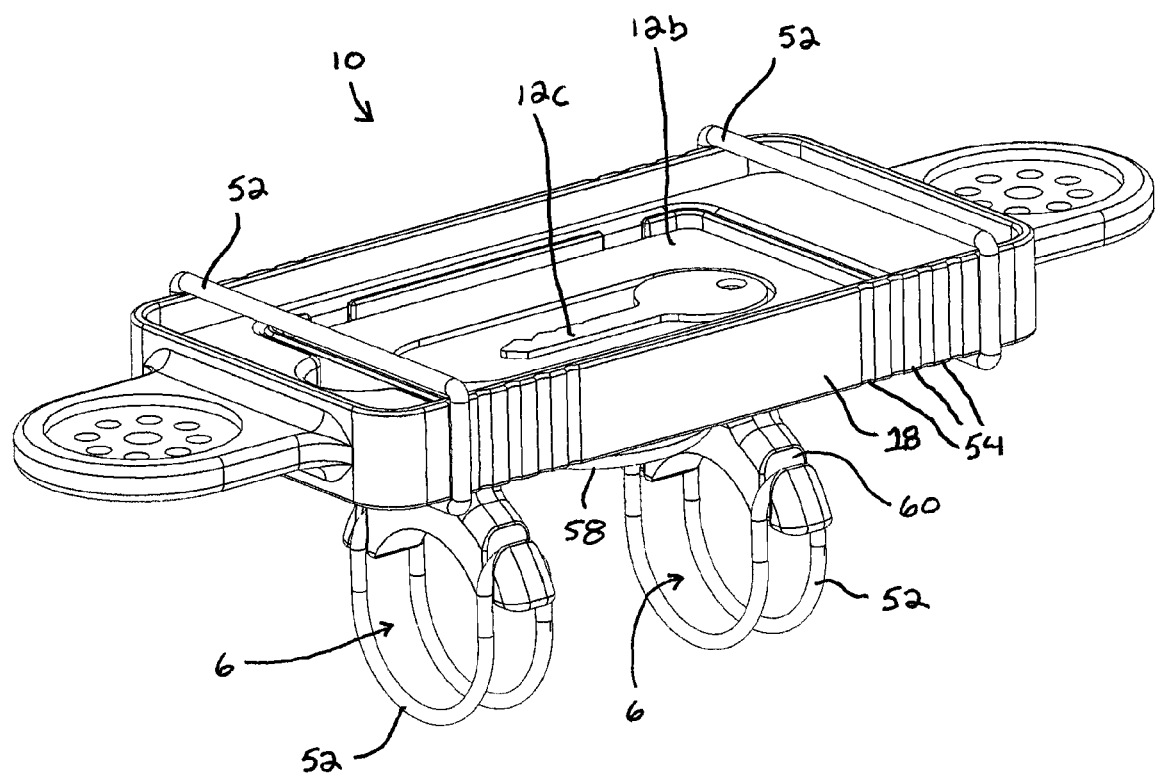
FIG. 12 is another top perspective view of the mounting device thereof, wherein certain accessories are removed for clarity.
Figure 13:
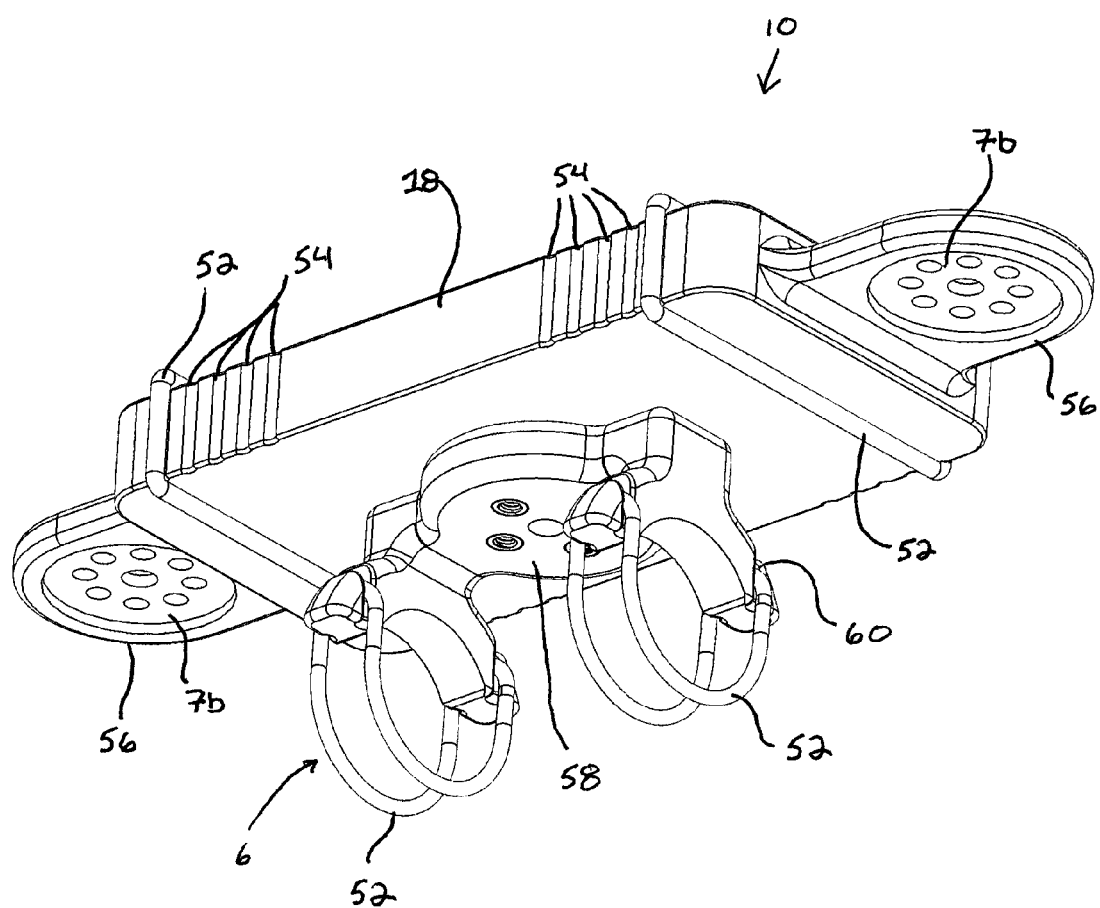
FIG. 13 is a bottom perspective view thereof.

As shown in FIGS. 11-13, the base 58 and the band(s) 52 combine to form an attachment area or passageway 6 to receive at least a portion of the location and/or object 14. One or more bottom surfaces of the base 58 may be at least slightly arcuate or concave (see FIGS. 13, 14 and 16-18) to complementarily mate with or receive a curved portion of the location and/or object 14. However, the bottom surface (es) of the base 58 are not limited to such a shape. Since the band(s) 52 is/are flexible, the UMD 10 of the sixth embodiment can be attached to a location and/or object 14 having a variety of different sizes and/or shapes.

Figure 17:
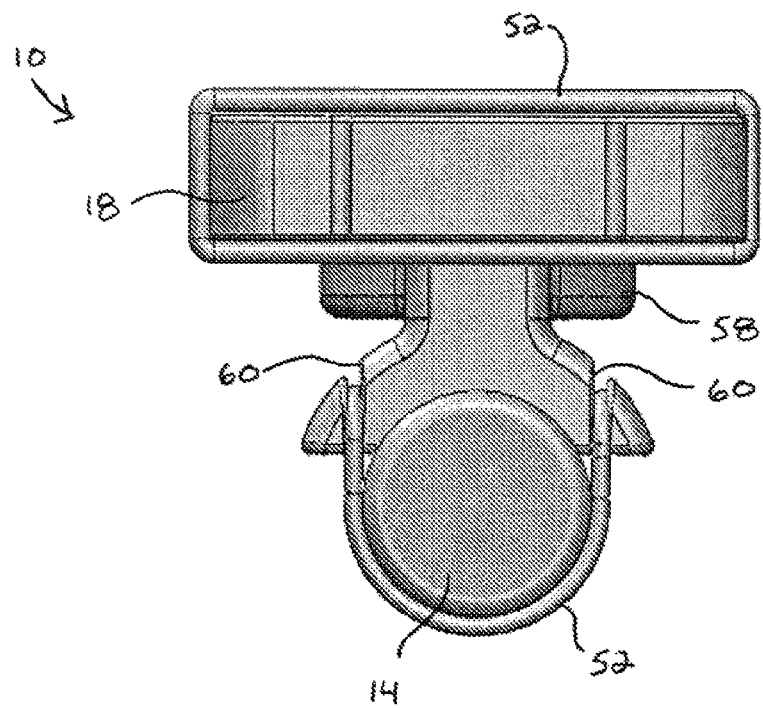
FIG. 17 is a side elevation view thereof, wherein the device is shown attached to an object.
Figure 18:
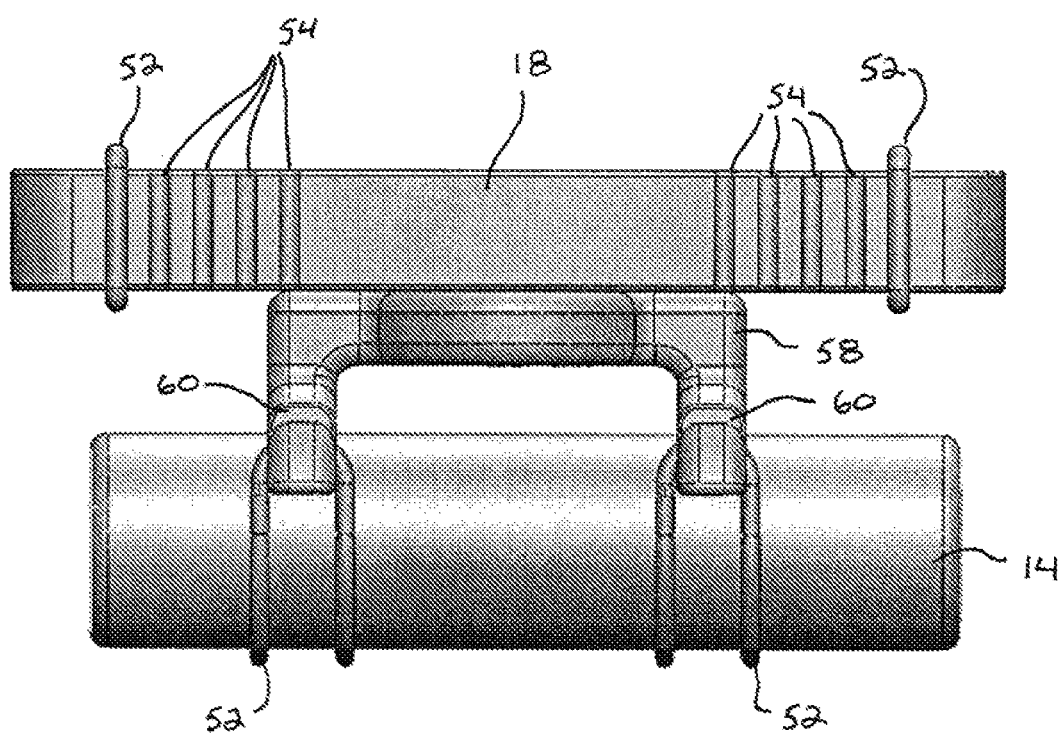
FIG. 18 is a front elevation view thereof, wherein the device is shown attached to an object.
Figure 19:
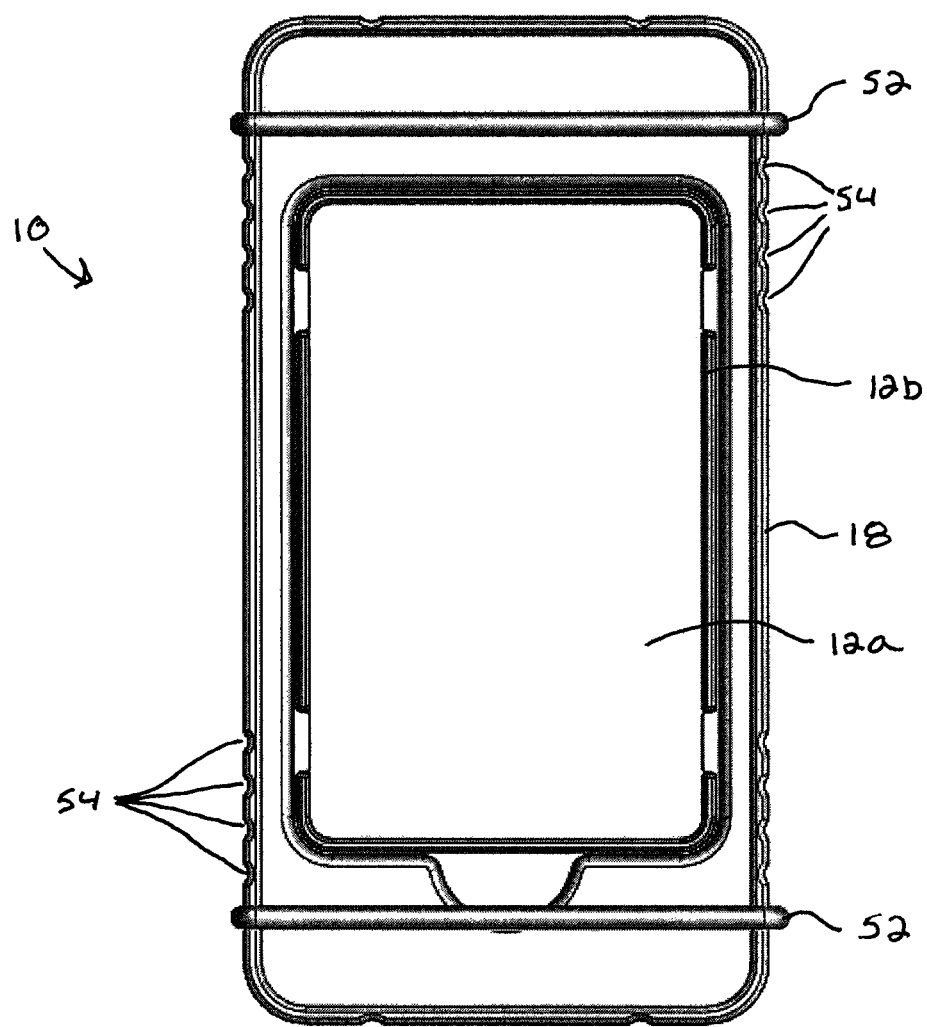
FIG. 19 is a top plan view thereof.
Figure 20:
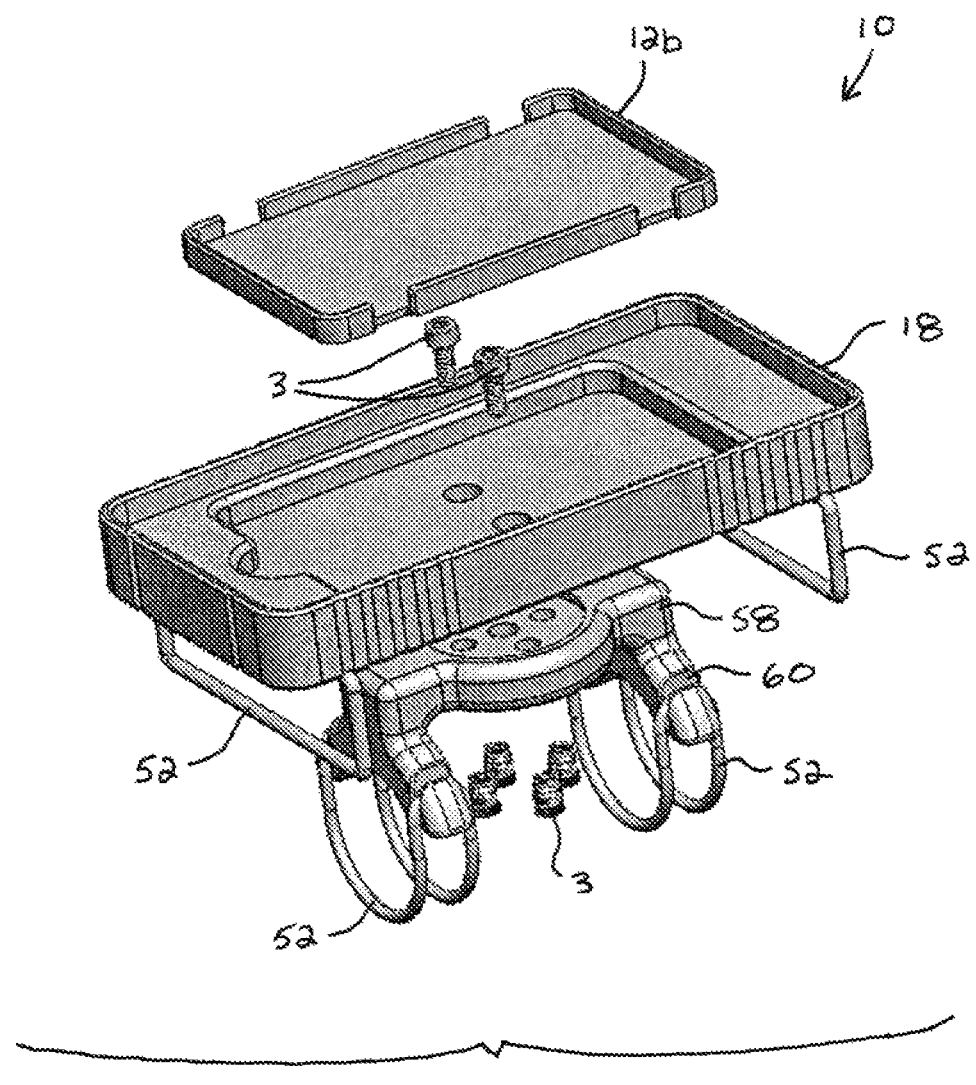
FIG. 20 is a partially exploded top perspective view thereof.

FIGS. 16-20 show a seventh embodiment of the UMD 10, which is substantially similar to the sixth embodiment described in detail above. Description of certain similarities between the two embodiments may be omitted herein for the sake of brevity and convenience, but such omission is not limiting. A distinguishing feature of the seventh embodiment is that the housing 18 does not include the extension(s) 56 shown in FIGS. 11-15. In one sense, the seventh embodiment is a more simplified version of the sixth embodiment. FIGS. 17 and 18 show how the base 58 and the band(s) 52 may engage at least a portion of the location and/or object 14, such as the handlebar of a bicycle.

Figure 21:
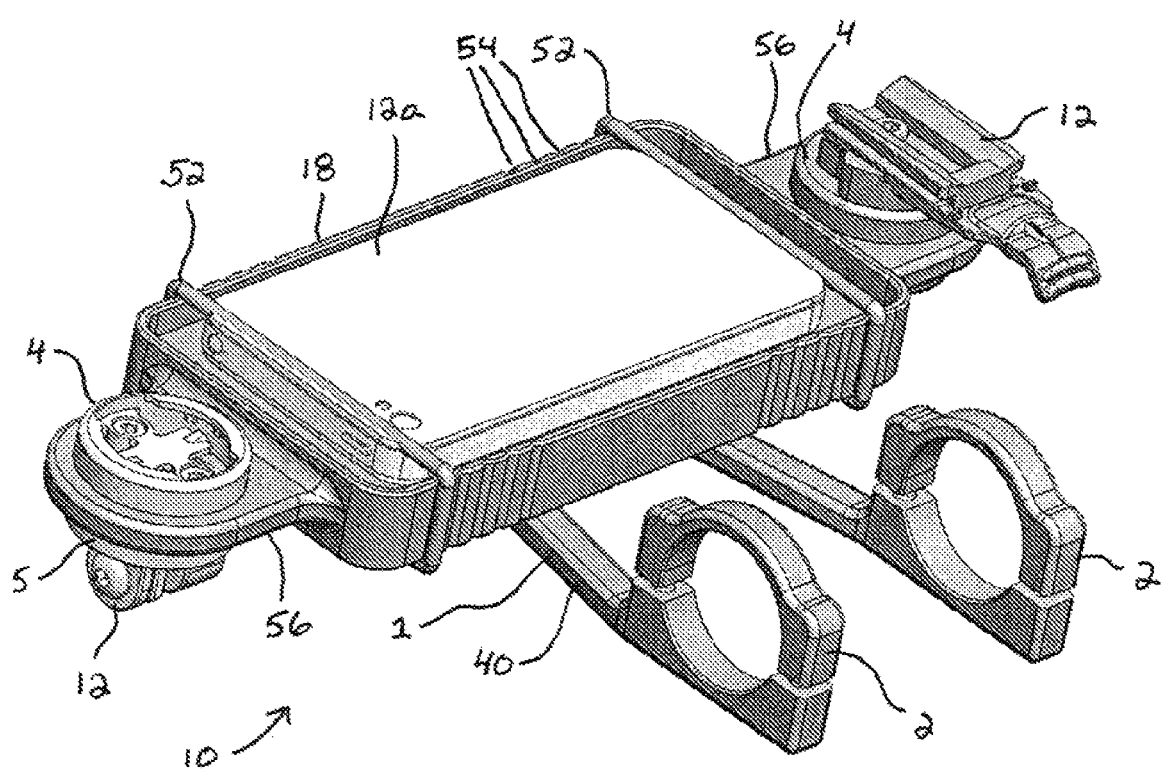
FIG. 21 is a top perspective view of a mounting device according to an eighth embodiment of the present disclosure, wherein various accessories are shown.

FIG. 21 shows an eighth embodiment of the UMD 10. The eighth embodiment is a combination of the first embodiment and the sixth embodiment described in detail above. Certain similarities between the embodiments may be omitted herein for the sake of brevity and convenience, but such omission is not limiting. In the eighth embodiment, the base 58 may be omitted. Instead, the front end 1a of the chassis 1 may be attached to the housing 18 by one or more of the mounting hardware 3 passing therethrough. Thus, the housing 18 may be attached to the location and/or the object 14 by either the base 18 or the chassis 1.

Figure 22:
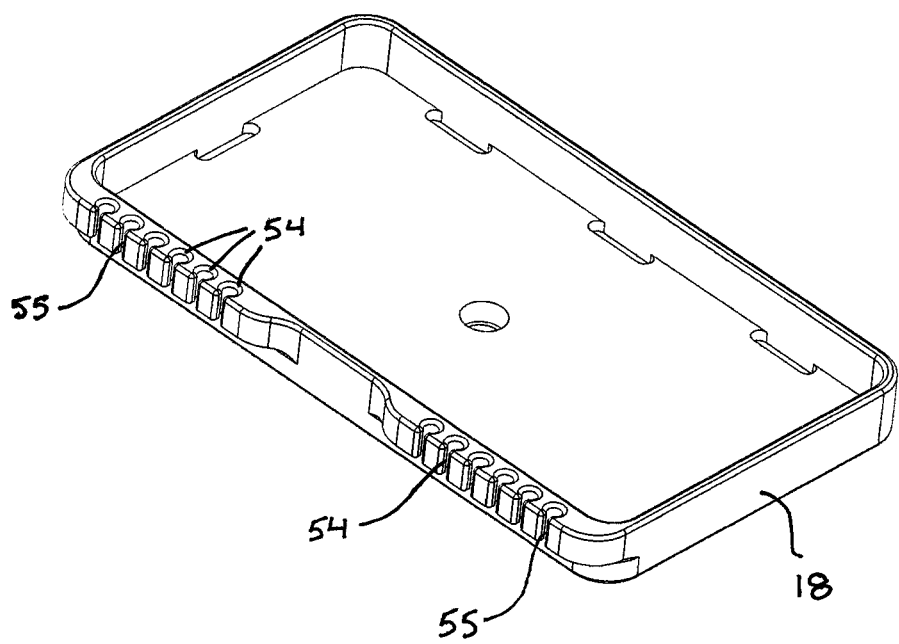
FIG. 22 is a top perspective view of at least a portion of a mounting device according to a ninth embodiment of the present disclosure.
Figure 23:
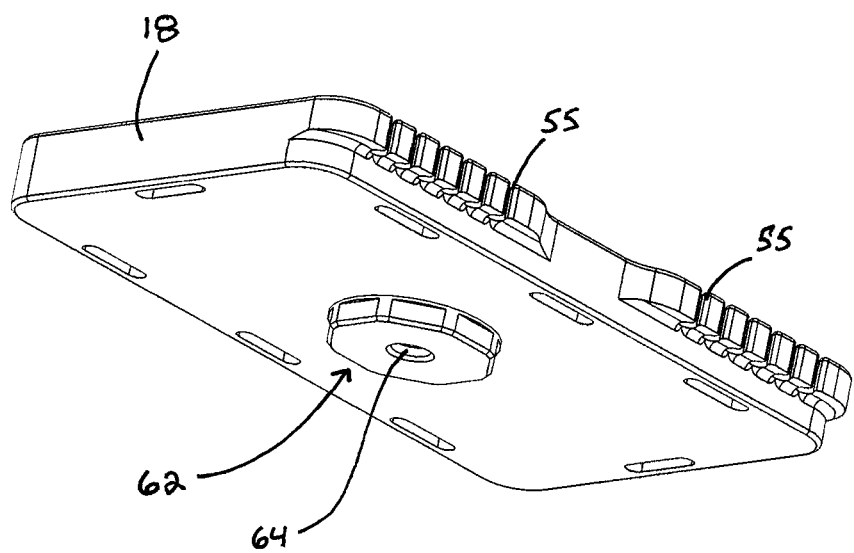
FIG. 23 is a bottom perspective view thereof.
Figure 24:
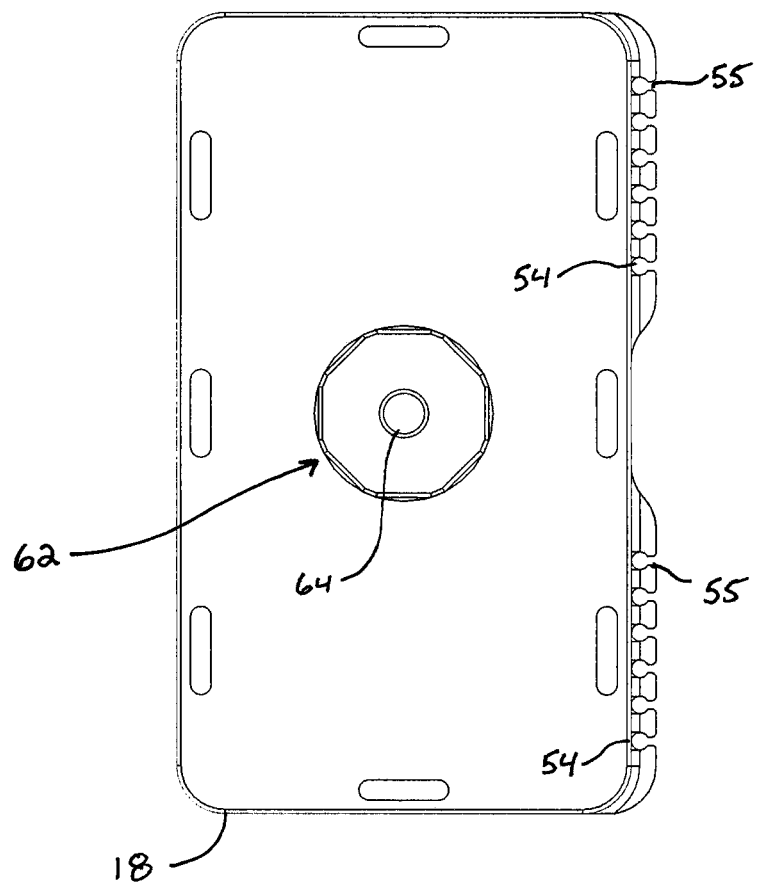
FIG. 24 is a bottom plan view thereof.

FIGS. 22-24 show the housing or cradle 18 of a ninth embodiment of the UMD 10. The housing 18 of the ninth embodiment is substantially similar to the housing 18 of the embodiments described above. Certain similarities between the embodiments may be omitted herein for the sake of brevity and convenience, but such omission is not limiting. The housing 18 of the ninth embodiment may include one or more grooves 54 on only one side or edge thereof. Each groove 54 may at least partially form an arcuate or circular receptacle, which may retain at least one band 52 while allowing the band 52 to rotate around the housing 18. A narrow opening 55 of each groove 54 permits the band 52 to be removed therefrom, but generally prevents inadvertent removal of the band 52 from the groove 54. The housing 18 of the ninth embodiment includes the cavity 50 to receive and/or engage a mobile phone 12a (see FIG. 11), but not a recess 51 as shown in FIG. 14.

As shown in FIGS. 23 and 24, a bottom surface of the housing 18 of the ninth embodiment may include a projection or recess 62 that is sized, shaped and/or configured to matingly engage at least a top portion of a base 58 (see FIG. 14). The projection 62 may extend outwardly or downwardly beyond the bottom surface of the housing 18. The projection 62 may be in the shape of an octagon when viewed from below. The top portion of the base 58 may include a complementary recess (not shown) having a corresponding octagonal shape, which would allow the housing 18 to fixedly engage the base 58. A single passageway 64 may extend through a geometric center of the projection 62. The passageway 64 may be sized and/or shaped to receive and/or engage at least a portion of one or more of the mounting hardware 3. The passageway 64 may or may not be threaded.

Figure 25:
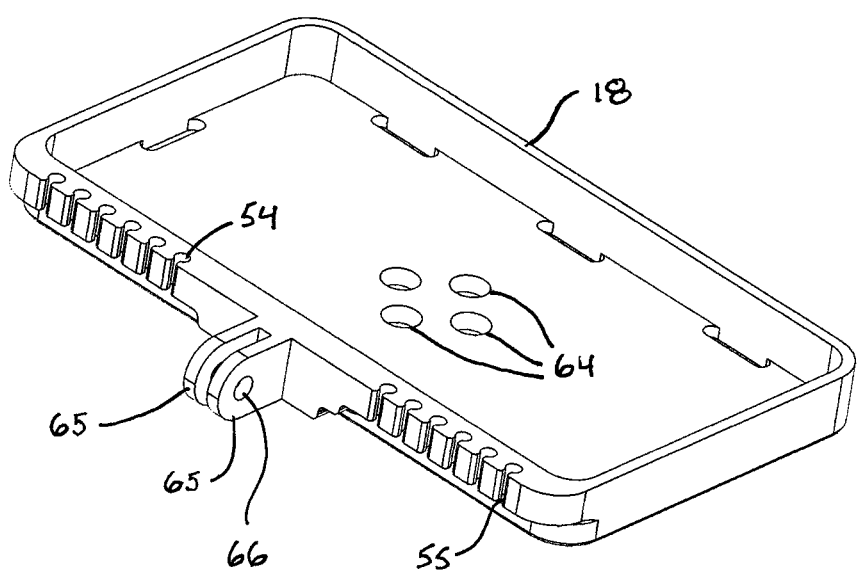
FIG. 25 is a top perspective view of at least a portion of a mounting device according to a tenth embodiment of the present disclosure.
Figure 26:
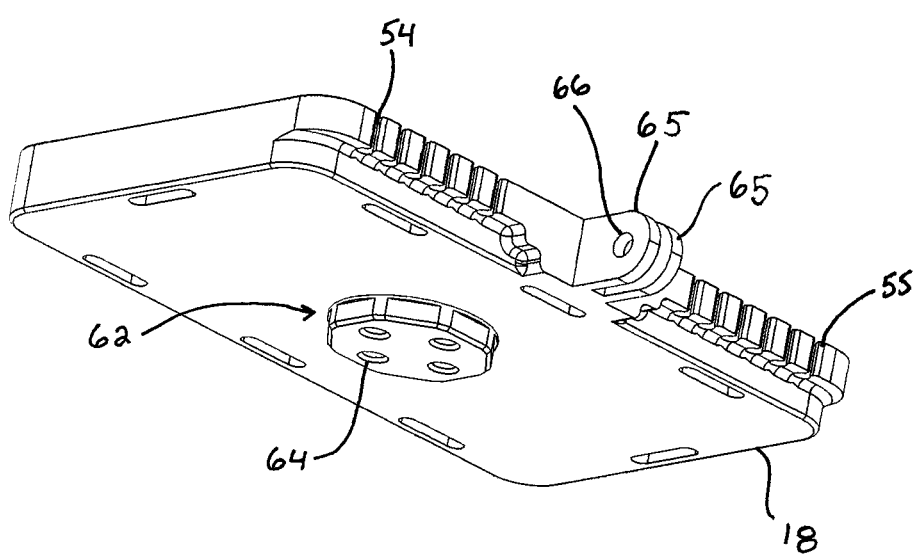
FIG. 26 is a bottom perspective view thereof.
Figure 27:
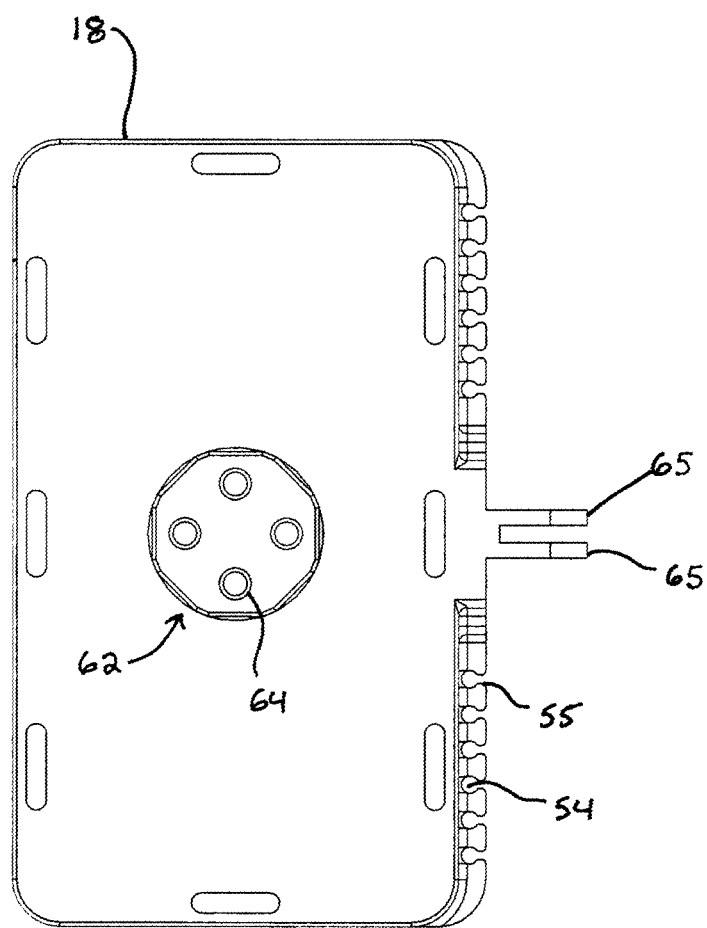
FIG. 27 is a bottom plan view thereof.

FIGS. 25-27 show the housing or cradle 18 of a tenth embodiment of the UMD 10. The housing 18 of the tenth embodiment is substantially similar to the housing 18 of the ninth embodiment described above. Certain similarities between the embodiments may be omitted herein for the sake of brevity and convenience, but such omission is not limiting. The housing 18 of the tenth embodiment may include one or more extensions 65 extending laterally outwardly from at least one side or edge thereof. Each extension 65 may include an opening 66 that extends therethrough. The extension(s) 65 and the opening(s) 66 are sized, shaped and/or configured to directly engage and/or be pivotally attached to one or more of the accessories 12, such as a GoPro® camera. More specifically, a pin or projection (not shown) of a portion of a GoPro® camera or a case thereof may extend into and/or through the opening(s) 66. Further, two, four or more spaced-apart passageways 64 may extend through the projection 62 and may each be sized and/or shaped to receive and/or engage at least a portion of one of the mounting hardware 3.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A device comprising:
   a housing defining a cavity configured to receive at least a portion of an accessory therein, the housing having a bottom surface and a sidewall extending upwardly therefrom, the bottom surface of the housing extending in a plane;
   a base attached to at least a portion of the housing, the base including at least one of a groove and a projection;
   at least one fastener extending through the bottom surface of the housing and into at least a portion of the base, the fastener having a first end, an opposing second end, and a longitudinal axis extending therebetween, the longitudinal axis of the fastener extending perpendicularly to the plane of the bottom surface of the housing; and
   at least two bands, a first one of the bands surrounding at least a portion of the housing and configured to secure the accessory at least partially within the cavity of the housing, at least a portion of a second one of the bands being positioned within the groove or contacting the projection, the second one of the bands and the base combining to secure the device to an object.

2. The device according to claim 1, further comprising:
   at least one extension extending outwardly from a sidewall of the housing, the extension including a top mount interface and an opposing bottom mount interface, at least one opening extends through the extension from the top mount interface to the bottom mount interface.

3. The device according to claim 1, wherein the housing includes at least one ridge configured to engage at least a portion of the first one of the bands to at least reduce unintended removal or movement of the first one of the bands with respect to the housing.

4. The device according to claim 1, wherein the housing includes a plurality of spaced-apart grooves on only one side thereof, each groove including an arcuate receptacle configured to receive at least a portion of the first one of the bands and a narrow opening to prevent inadvertent remove of the first one of the bands from the groove.

5. The device according to claim 1, wherein a recess is formed within the cavity, and at least one cut-out is formed within the cavity.

6. The device according to claim 1, wherein the at least two bands include four separate bands, two of the four bands surrounding at least a portion of the housing and configured to secure the accessory at least partially within the cavity of the housing, and two of the four bands surrounding at least a portion of the base.

7. The device according to claim 6, wherein the at least one of a groove and a projection of the base comprises two spaced-apart grooves, each groove being configured to receive at least a portion of one of the bands therein.

8. The device according to claim 1, wherein a projection extends outwardly from a bottom surface of the housing, the projection engaging at least a portion of the base to prevent rotation of the housing with respect to the base.

9. The device according to claim 1, wherein the housing includes one or more extensions extending laterally outwardly from one side thereof, each extension including an opening extending therethrough.

10. A combination comprising:
a vehicle;
at least one accessory; and
a device configured to removably mount the accessory to the vehicle, the device comprising:
   a housing defining a cavity configured to receive at least a portion of the accessory therein;
   a base attached to at least a bottom surface of the housing, the base including at least one of a groove and a projection;
   at least one fastener extending through the housing and into at least a portion of the base; and
   at least two bands, a first one of the bands surrounding at least a portion of the housing and configured to secure the accessory at least partially within the cavity of the housing, the first one of the bands being removable from the housing, at least a portion of a second one of the bands being positioned within the groove or contacting the projection, the second one of the bands and the base combining to secure the device to the vehicle.

11. The combination of claim 10, wherein the vehicle is a bicycle having a handle bar, the second one of the bands and the base combining to surround at least a portion of the handle bar.

12. The combination of claim 11, wherein the at least one accessory includes at least one of a mobile phone, a credit card and a key.

13. The combination of claim 12, wherein a bottom surface of the base is at least slightly arcuate to complement an arcuate surface of the handle bar.

14. The combination of claim 12, further comprising:
   at least one extension extending outwardly from a sidewall of the housing, the extension including a top mount interface and an opposing bottom mount interface, at least one opening extends through the extension from the top mount interface to the bottom mount interface.

15. The combination of claim 12, wherein the at least two bands include four separate bands, two of the four bands surrounding at least a portion of the housing and configured to secure the accessory at least partially within the cavity of the housing, and two of the four bands surrounding at least a portion of the base.

16. The combination of claim 11, wherein a sidewall extends upwardly from the bottom surface of housing, wherein the bottom surface of the housing defines a plane, wherein the at least one fastener includes a first end, an opposing second end, and a longitudinal axis extending therebetween, and wherein the longitudinal axis of the at least one fastener extends at least generally perpendicularly to the plane of the bottom surface of the housing.

17. The combination of claim 16, wherein the housing is positioned above the base, and wherein the base is positioned above the handlebars.

18. The device according to claim 1, wherein the sidewall of the housing extends around an entire periphery of the bottom surface.

19. The device according to claim 18, wherein the housing is positioned above the base.

* * * * *